United States Patent
Nagasawa

(10) Patent No.: US 11,472,367 B2
(45) Date of Patent: Oct. 18, 2022

(54) SEAT BELT DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 23 days.

(21) Appl. No.: 17/083,666

(22) Filed: Oct. 29, 2020

(65) Prior Publication Data

US 2021/0197760 A1 Jul. 1, 2021

(30) Foreign Application Priority Data

Dec. 27, 2019 (JP) .............................. JP2019-238345
Sep. 9, 2020 (JP) .............................. JP2020-151312

(51) Int. Cl.
*B60R 22/195* (2006.01)
*B60R 22/185* (2006.01)
*B60R 21/013* (2006.01)

(52) U.S. Cl.
CPC ........ *B60R 22/1952* (2013.01); *B60R 21/013* (2013.01); *B60R 2022/1957* (2013.01)

(58) Field of Classification Search
CPC . B60R 22/185; B60R 22/1855; B60R 22/195; B60R 22/1951; B60R 22/1952; B60R 2022/1957
See application file for complete search history.

(56) References Cited

U.S. PATENT DOCUMENTS

| 2006/0138852 | A1 | 6/2006 | Ichida |
| 2009/0284067 | A1 | 11/2009 | Kling et al. |
| 2016/0206050 | A1 | 7/2016 | Aoyagi |
| 2019/0135224 | A1 | 5/2019 | Krambeck et al. |
| 2019/0208869 | A1 | 7/2019 | Lee et al. |
| 2019/0263348 | A1* | 8/2019 | Ruthinowski ........... B60R 22/28 |
| 2020/0114867 | A1 | 4/2020 | Ryl |

(Continued)

FOREIGN PATENT DOCUMENTS

| CN | 101580050 A | 11/2009 |
| CN | 110450753 A | 11/2019 |

(Continued)

OTHER PUBLICATIONS

Non Final Office Action dated Oct. 25, 2021 in U.S. Appl. No. 17/083,694 (9 pages).

Primary Examiner — Barry Gooden, Jr.
(74) Attorney, Agent, or Firm — Smith, Gambrell & Russell, LLP

(57) ABSTRACT

A seat belt device includes a webbing, a locking tongue, and a guide. The webbing includes a lap belt and a shoulder belt. The locking tongue is configured to undergo a change from a free state, in which the webbing is capable of passing between a side of the lap belt and a side of the shoulder belt, to a lock state, in which the webbing is not capable of passing between the side of the lap belt and the side of the shoulder belt, in accordance with a collision or a warning of the collision of a vehicle. The guide is configured to, in accordance with the collision or the warning of the collision of the vehicle, displace a location on the shoulder belt that is adjacent to the locking tongue in a direction away from the occupant before the change to the lock state is completed.

17 Claims, 12 Drawing Sheets

(56) References Cited

U.S. PATENT DOCUMENTS

2021/0197759 A1 7/2021 Nagasawa
2021/0197761 A1 7/2021 Nagasawa

FOREIGN PATENT DOCUMENTS

| | | |
|---|---|---|
| DE | 10 2004 023 394 A1 | 12/2005 |
| DE | 10 2015 202 460 A1 | 8/2016 |
| JP | 2007-186167 A | 7/2007 |
| JP | 2015-013565 A | 1/2015 |
| JP | 2018-184082 A | 11/2018 |
| WO | 2013/099590 A1 | 7/2013 |

\* cited by examiner

SEAT BELT DEVICE

CROSS-REFERENCE TO RELATED APPLICATIONS

The present application claims priority from Japanese Patent Application No. 2019-238345 filed on Dec. 27, 2019, and Japanese Patent Application No. 2020-151312 filed on Sep. 9, 2020, the entire contents of which are hereby incorporated by reference.

BACKGROUND

The disclosure relates to a seat belt device that restrains an occupant that is seated on a seat of a vehicle.

For example, in order to restrain an occupant that is seated on a seat of a vehicle, such as an automobile, and reduce the possibility of the occupant being injured in, for example, a collision, a three-point seat belt is widely used.

A three-point seat belt includes a lap belt that is provided to extend in a vehicle-width direction along the front of the abdomen of an occupant and a shoulder belt that is provided obliquely along the front of the chest of the occupant.

As a related art regarding a three-point seat belt, for example, Japanese Unexamined Patent Application Publication No. 2007-186167 describes that, in order to increase the ability to restrain an occupant by a webbing, a guide-like portion is provided so that a shoulder-belt-side opening in a tongue is disposed opposite to a seat and on a vehicle upward side.

SUMMARY

An aspect of the disclosure provides a seat belt device including a webbing, a locking tongue, and a guide. The webbing includes a lap belt and a shoulder belt. At least a portion of the lap belt is configured to be disposed to extend in a vehicle-width direction along a front of an abdomen of an occupant. At least a portion of the shoulder belt is configured to be disposed obliquely along a front of a chest of the occupant. The locking tongue has a slit that is provided to insert an intermediate portion of the webbing therein. The locking tongue is provided between the lap belt and the shoulder belt. The locking tongue is configured to be coupled to a vehicle body when the occupant fastens the seat belt device. The locking tongue is configured to undergo a change from a free state to a lock state in accordance with a collision or a warning of the collision of a vehicle. The free state is a state in which the webbing is capable of passing between a side of the lap belt and a side of the shoulder belt. The lock state is a state in which the webbing is not capable of passing between the side of the lap belt and the side of the shoulder belt. The guide is configured to, in accordance with the collision or the warning of the collision of the vehicle, displace a location on the shoulder belt that is adjacent to the locking tongue in a direction away from the occupant in the vehicle-width direction before the change to the lock state of the locking tongue is completed.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

In a frontal collision, a seat belt device is an effective device for reducing injuries to the chest of an occupant or secondary collisions with other components in the interior of a vehicle.

However, for a three-point seat belt including a shoulder belt disposed obliquely, when a tongue-side (low-side) portion of the shoulder belt is raised relatively to the chest due to, for example, an occupant moving so that the upper part of the occupant's body is tilted forward, or an increase in tension of a webbing caused by, for example, the operation of a pretensioner, the seat belt may compress the vicinity of a rib upward and thus a bending force may be generated at the rib.

In view of the problem above, it is desirable to provide a seat belt device that reduces injury to the chest caused by a shoulder belt.

First Embodiment

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A first embodiment the disclosure is described below.

A seat belt device of the first embodiment is, for example, a three-point seat belt that is provided at a front seat on which an occupant facing the front is to be seated in an automobile, such as a passenger car.

Figure 1:
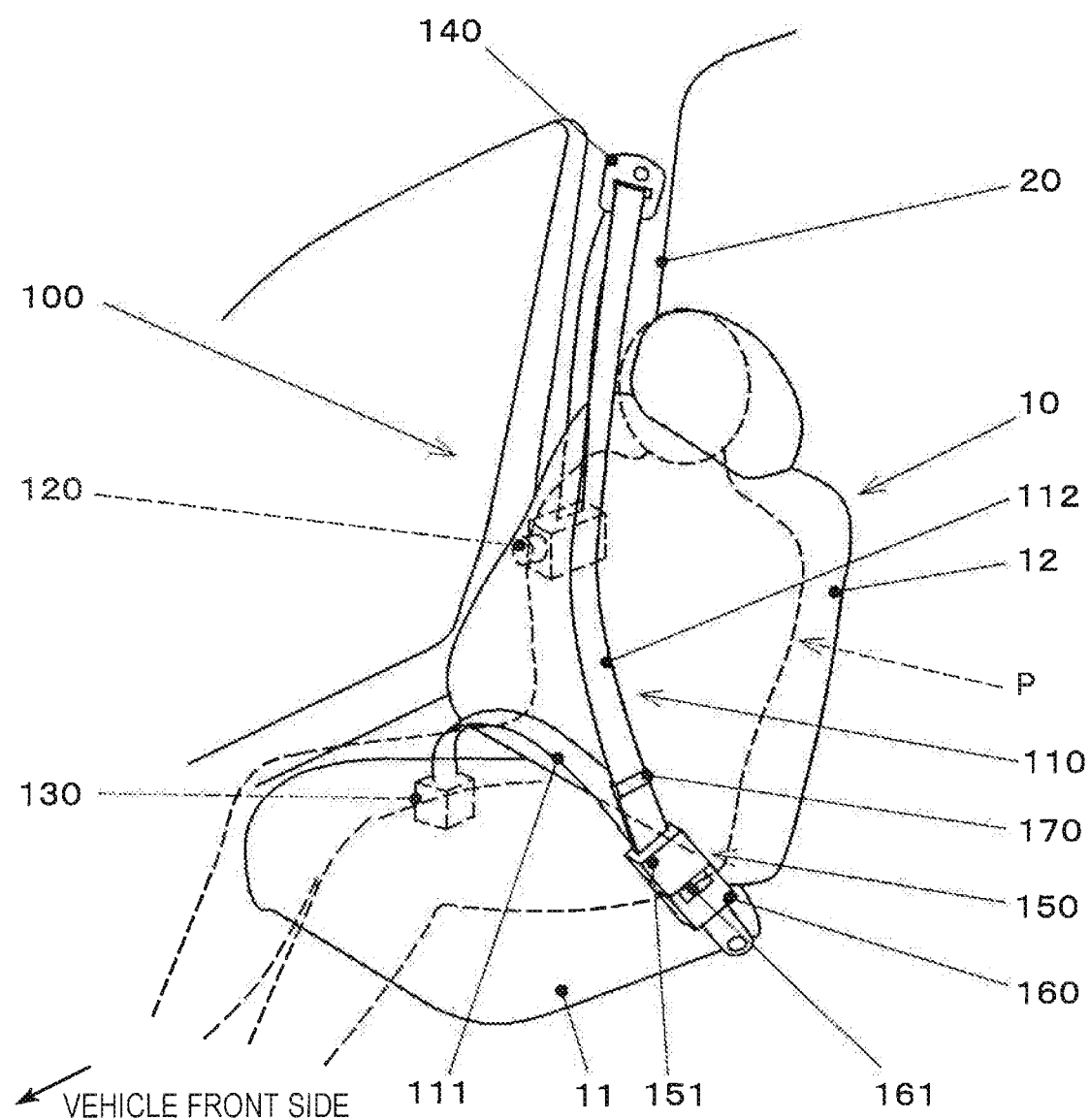
FIG. 1 is a perspective view schematically illustrating a structure of a first embodiment of a seat belt device to which an embodiment of the disclosure is applied.

FIG. 1 is a perspective view schematically illustrating a structure of the seat belt device of the first embodiment.

A seat 10 on which an occupant P is to be seated includes a cushion 11 and a seat back 12.

The cushion 11 is a portion that is provided at a lower portion of the seat 10 and that includes a seat portion on which the buttocks and the femoral region of the occupant P are to be placed.

The seat back 12 is a portion that is provided to protrude upward from the vicinity of a back end of the seat portion and that holds, for example, the back and the shoulders of the occupant P.

A B pillar 20 is provided on one side of the seat 10 in a vehicle-width direction.

The B pillar 20 is a columnar vehicle-body structural member that extends in an up-down direction along a back edge of a door opening through which the occupant P gets into and out of the automobile.

For example, the seat belt device 100 includes a webbing 110, a retractor 120, a lap pretensioner 130, a shoulder anchor 140, a locking tongue 150, a buckle 160, and a guide 170.

The webbing 110 is a belt-shaped member that is made flexible as a result of, for example, being knitted from polyester fiber.

The webbing 110 includes a lap belt 111 and a shoulder belt 112 with the locking tongue 150 as a boundary, the locking tongue 150 being where an intermediate portion of the webbing 110 is inserted and folded.

The lap belt 111 is disposed to extend in the vehicle-width direction primarily along the front of the abdomen of the occupant P.

The shoulder belt 112 is disposed primarily along the front of the chest of the occupant P.

The shoulder belt 112 is disposed obliquely so that a B-pillar-20 side in the vehicle-width direction is higher.

A shoulder-belt-112-side end of the webbing 110 is coupled to the retractor 120, and the retractor 120 is mounted on a lower portion of the B pillar 20.

The retractor 120 has the function of retracting and accommodating an excess portion of the webbing 110.

The webbing 110 is capable of being pulled upward from the retractor 120.

The retractor 120 is provided with a shoulder pretensioner 121 (see FIG. 4) that by using, for example, an actuator using an explosive gas-generating device, pulls the shoulder belt 112 in accordance with a command output from a seat belt control unit 210.

The lap pretensioner 130 is provided in the vicinity of a lower end of the B pillar 20 of a vehicle body, and a vehicle-width-direction outer end of the lap belt 111 of the webbing 110 is coupled to the lap pretensioner 130.

The lap pretensioner 130 has the function of, by using, for example, an actuator using an explosive gas-generating device, pulling the lap belt 111 in accordance with a command output from the seat belt control unit 210.

The shoulder anchor 140 is a portion that is provided in the vicinity of an upper end of the B pillar 20 of the vehicle body, and is a portion where the shoulder belt 112 of the webbing 110 pulled upward from the retractor 120 is folded toward the locking tongue 150 disposed obliquely below the shoulder belt 112.

The shoulder anchor 140 is capable of rotating around an axis extending substantially in the vehicle-width direction with respect to the B pillar 20 and reduces interference with the passage of the webbing 110 between the retractor 120 and the locking tongue 150.

The locking tongue 150 is a member that is removably mounted on the buckle 160 with the webbing 110 being inserted therein.

In the webbing 110, a region on the side of the pretensioner 130 with respect to the locking tongue 150 functions as the lap belt 111, and a region on the side of the shoulder anchor 140 with respect to the locking tongue 150 functions as the shoulder belt 112.

The locking tongue 150 is configured to reduce interference with the passage of the webbing 110 at the time of ordinary use of a vehicle (in a non-collision state of the vehicle). When the tension of the webbing 110 is increased due to, for example, a collision of the vehicle, the locking tongue 150 restrains the webbing 110. The webbing 110 is such that, in the restrained state, a back-and-forth movement at the lap belt 111 and the shoulder belt 112 is restricted (locked).

Next, a structure of the locking tongue 150 is described.

Figure 2:
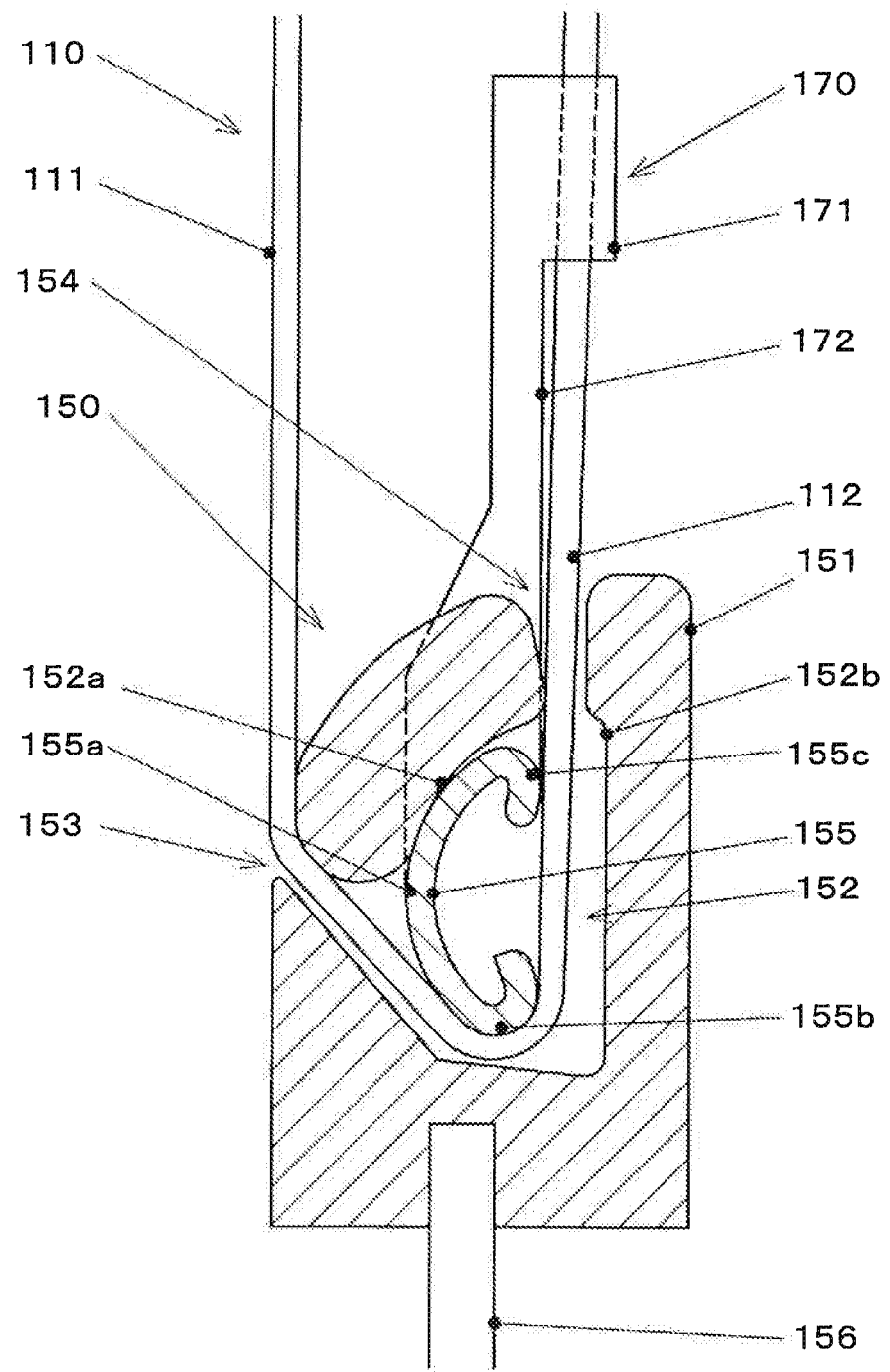
FIG. 2 is a schematic sectional view of a locking tongue in the seat belt device of the first embodiment, and illustrates a free state.
Figure 3:
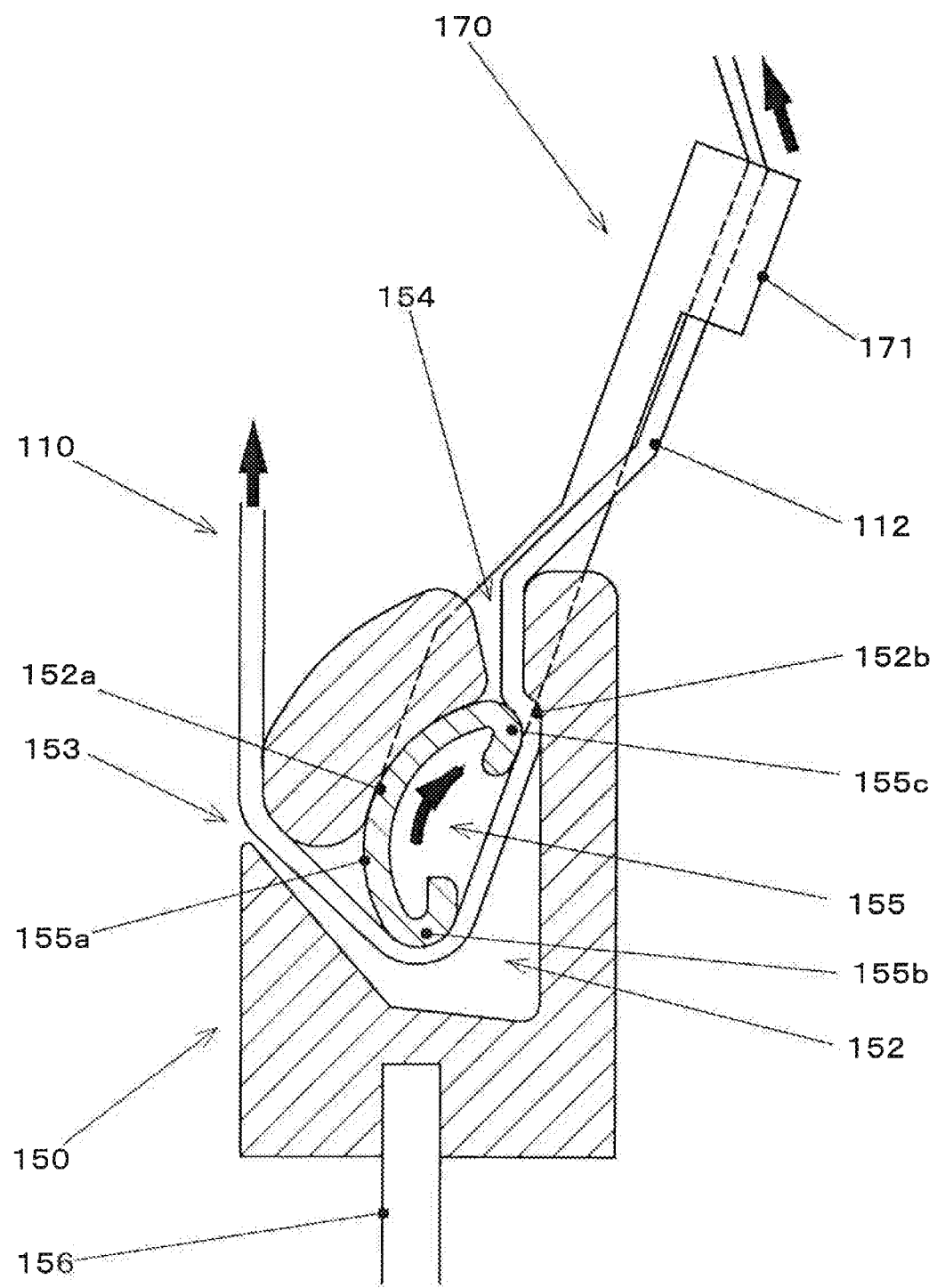
FIG. 3 is a schematic sectional view of the locking tongue in the seat belt device of the first embodiment, and illustrates a lock state.

FIGS. 2 and 3 are each a schematic sectional view of the locking tongue in the seat belt device of the first embodiment, FIG. 2 illustrating a free state and FIG. 3 illustrating a lock state.

The locking tongue 150 includes, for example, a main body 151, a space 152, a lap belt slit 153, a shoulder belt slit 154, a lock member 155, and a tongue plate 156.

The main body 151 is a portion where the webbing 110 is inserted therein with the webbing 110 folded between the lap belt 111 and the shoulder belt 112.

The main body 151 is made of a combination of, for example, a metal material and a hard resin material to have sufficient strength with respect to a maximum tension that acts on the webbing 110 when, for example, a collision accident occurs. Note that FIGS. 2 and 3 illustrate the main body 151 in a simplified manner. Similarly, FIGS. 7 to 9 below illustrate a main body 151 in a simplified manner.

The space 152 is a hollow portion formed in the main body 151 and accommodates, for example, a part of the webbing 110 and the lock member 155.

A sliding surface 152a and a lock recess 152b are formed at an inner surface defining the space 152.

The sliding surface 152a is a portion that has a concave shape, that comes into contact with a sliding surface 155a of the lock member 155, and that slides mutually with the sliding surface 155a when the lock member 155 operates.

The sliding surface 152a is formed at an inner surface of a region between the lap belt slit 153 and the shoulder belt slit 154 in the main body 151.

The lock recess 152b is a portion that, when a tension that is greater than or equal to a predetermined tension has been applied to the webbing 110 and the lock member 155 has moved, works together with the lock member 155, allows the webbing 110 to be interposed between it and the lock member 155, and locks the webbing 110.

The lock recess 152b is formed at the inner surface defining the space 152 in a region adjacent to the sliding surface 152a and the shoulder belt slit 154 that are interposed between corresponding portions of the lock recess 152b.

The lap belt slit 153 and the shoulder belt slit 154 are openings that are formed from a surface of the main body 151 to an inner portion of the space 152 to extend therethrough, and allow the webbing 110 to be inserted therein.

The lap belt slit 153 and the shoulder belt slit 154 are formed as slits having the shape of long holes having a longitudinal direction in a width direction of the webbing 110 (a direction orthogonal to a sheet plane in FIGS. 2 and 3).

The lap belt slit 153 is provided for introducing an end of the lap belt 111 into the space 152.

The shoulder belt slit 154 is provided for introducing an end of the shoulder belt 112 into the space 152.

The lock member 155 is disposed in the space 152 and that moves from a free (release) position to a lock position in accordance with an increase in the tension of the webbing 110, the free position being where the passage of the webbing 110 is allowed and the lock position being where the webbing 110 is restrained. In one embodiment, the lock member 155 may serve as a "movable member".

The lock member 155 includes, for example, the sliding surface 155a, a webbing contact member 155b, and a webbing restrainer 155c.

The sliding surface 155a is a convex-shaped portion that in a slidable state comes into contact with the sliding surface 152a defining the space 152 of the main body 151.

The webbing contact member 155b is a convex-shaped portion that is provided at one end side (lower end in FIGS. 2 and 3) of the sliding surface 155a and comes into contact with a fold portion of the webbing 110.

The webbing restrainer 155c is a restrainer that, when the locking tongue 150 is in a lock state, works together with the lock recess 152b, allows the webbing 110 to be interposed between it and the lock recess 152b, and restrains the webbing 110. In the lock state, the webbing 110 is locked to reduce passage and movement of the webbing 110 through the locking tongue 150 at a location between the lap belt 111 and the shoulder belt 112.

The webbing restrainer 155c is provided on an end side of the sliding surface 155a (upper end in FIGS. 2 and 3) opposite to a webbing-contact-member-155b side of the sliding surface 155a.

The webbing 110 is folded from a lap-belt-111 side to a shoulder-belt-112 side at the webbing contact member 155b.

When the locking tongue 150 is in a free state, the webbing 110 slides along a surface of the webbing contact member 155b and thus is brought into a state in which the webbing 110 can freely pass through the locking tongue 150 (can pass toward the side of the lap belt 111 or the side of the shoulder belt 112).

When the tension that acts on the webbing 110 is increased in a vehicle collision, the locking tongue 150 is brought from the free state illustrated in FIG. 2 into the lock state illustrated in FIG. 3.

The tension of the webbing 110 causes the lock member 155 to be lifted in FIGS. 2 and 3 and the sliding surfaces 152a and 155a move while sliding mutually.

At this time, the lock member 155 rotates (clockwise in FIGS. 2 and 3) along the curvatures of the sliding surfaces 152a and 155a so that the webbing restrainer 155c (upper end) is displaced away from the occupant P in the vehicle-width direction (towards the right in FIGS. 2 and 3).

At a termination of a range of movement of the lock member 155, the webbing restrainer 155c of the lock member 155 restrains the webbing 110 between it and the lock recess 152b formed at the space 152.

The tongue plate 156 is a member that protrudes from a lower end of the locking tongue 150 at the time of use thereof and that engages with an engaging mechanism of the buckle 160.

The tongue plate 156 is formed into a planar shape by using, for example, a metal material, such as a steel plate.

An upper portion of the tongue plate 156 is embedded and fixed in a lower portion of the main body 151 by, for example, insert-molding.

The buckle 160 is mounted at a location situated on an inner side in the vehicle-width direction of the cushion 11 of the seat 10 in the vehicle body and in the vicinity of a back end of the cushion 11.

The buckle 160 includes, for example, an engaging mechanism that, when the tongue plate 156 of the locking tongue 150 is inserted, engages therewith, and a release mechanism that releases the engaging mechanism.

A release button 161 that causes the release mechanism to perform a release operation is provided on a vehicle-width-direction inner surface of the buckle 160.

The guide 170 is a member that is provided to protrude upward from the main body 151 of the locking tongue 150 and that guides the shoulder belt 112 (restricts a position of passage thereof).

The guide 170 includes a shoulder belt holder 171 and a stay 172.

The shoulder belt holder 171 is provided at a protruding end of the guide 170 and has a slit having the shape of a long hole in which the shoulder belt 112 is inserted.

The stay 172 is a columnar member that couples an upper portion of the main body 151 of the locking tongue 150 and a lower portion of the shoulder belt holder 171 to each other, and that supports the shoulder belt holder 171.

The shoulder belt holder 171 and the stay 172 can be integrated with each other by, for example, insert-molding a core that is made of a metal or the like in a resin material.

A locking-tongue-150-side end of the stay 172 is coupled and fixed to the lock member 155.

Figure 6:
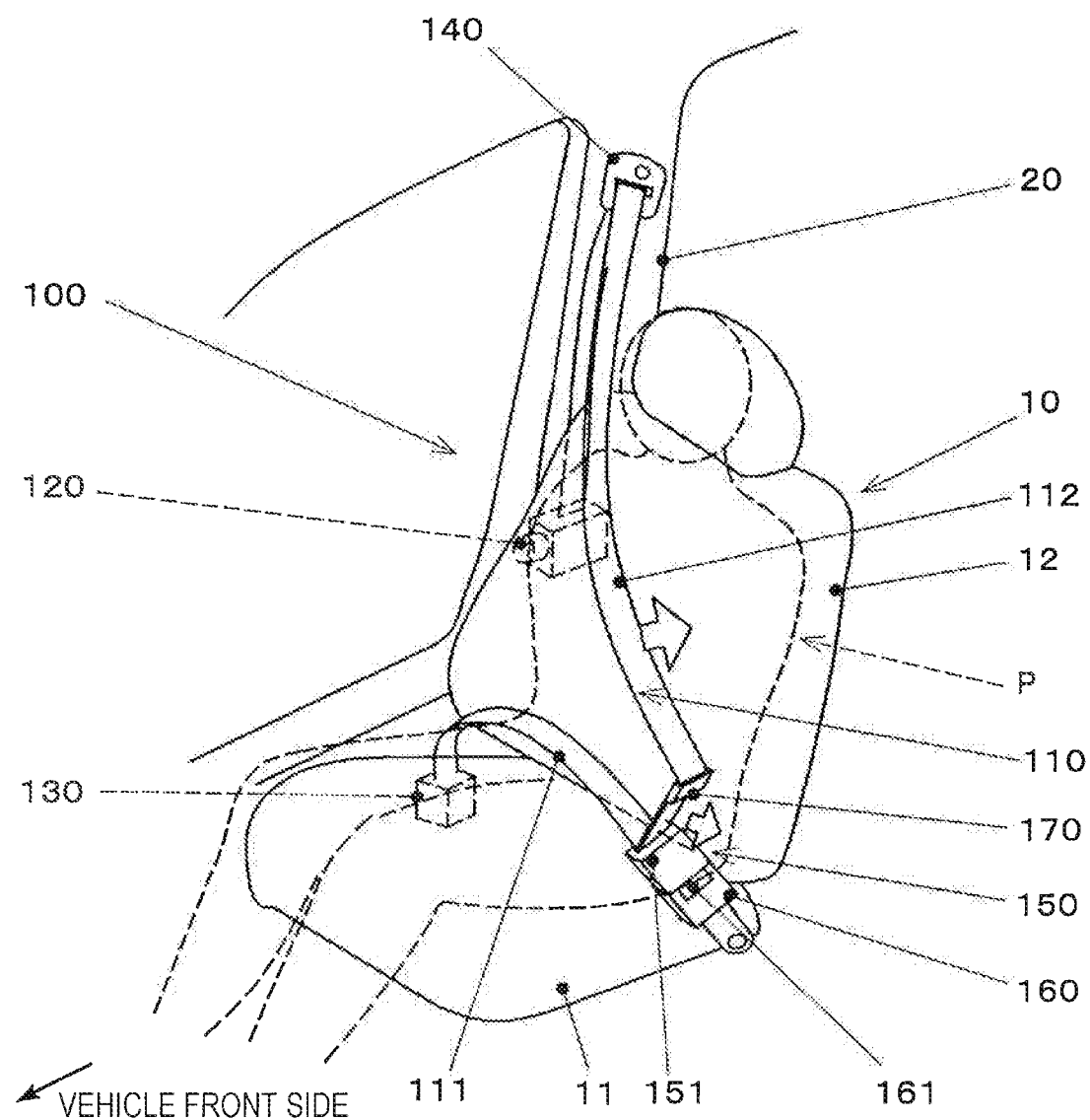
FIG. 6 is a perspective view schematically illustrating a state after a guide in the seat belt device of the first embodiment has rotated.

Such a structure makes it possible for the guide 170 to move in response to a change from the free state of the locking tongue 150 to the lock state of the locking tongue 150 (the rotation of the lock member 155 relative to the main body 151), and the shoulder belt holder 171 to be displaced in a direction away from the occupant P in the vehicle-width direction (toward the right in FIGS. 1 and 6).

Such a displacement is started before the change to the lock state of the locking tongue 150 is completed.

The seat belt device 100 includes a control system described below.

Figure 4:
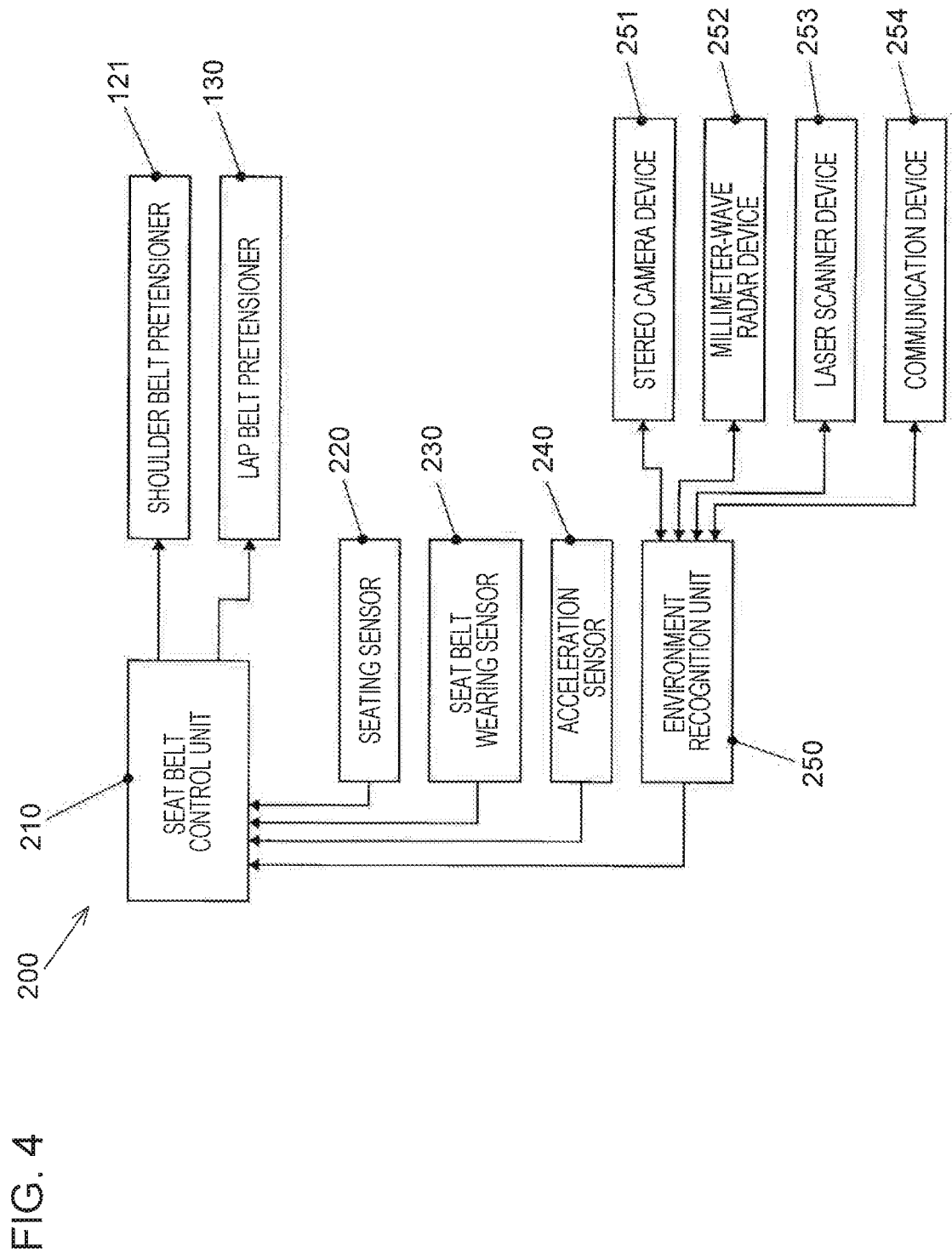
FIG. 4 is a block diagram schematically illustrating a configuration of a control system in the seat belt device of the first embodiment.

FIG. 4 is a block diagram schematically illustrating a configuration of the control system in the seat belt device of the first embodiment.

The control system 200 includes, for example, the seat belt control unit 210, a seating sensor 220, a seat belt wearing sensor 230, an acceleration sensor 240, and an environment recognition unit 250.

The seat belt control unit 210 detects a collision or a warning of a collision and issues a command to each actuator (pretensioner) of the seat belt device 100.

The seating sensor 220 is a load sensor that is provided at the cushion 11 of the seat 10 and detects whether the occupant P is seated on the seat 10.

The seat belt wearing sensor 230 is provided at the buckle 160 and detects a state in which the locking tongue 150 is coupled to the buckle 160 (seat belt wearing state).

The acceleration sensor 240 is provided at, for example, a front end of the vehicle body and detects acceleration in, for example, a front-back direction to which the vehicle body is subjected.

The acceleration sensor 240 is used as a sensor that detects a collision of the vehicle.

The environment recognition unit 250 recognizes, for example, information regarding road shapes, or other vehicles, pedestrians, buildings, topography, trees, or other obstacles around one's vehicle by utilizing communication, such as communication with various sensors, inter-vehicle communication, or road-to-vehicle communication.

For example, a stereo camera device 251, a millimeter-wave radar device 252, a laser scanner device 253, and a communication device 254 are coupled to the environment recognition unit 250.

The stereo camera device 251 includes a pair of cameras whose imaging range is toward the front of the vehicle and that are disposed apart from each other in the vehicle-width direction, and an image processor that performs a publicly known stereo image processing operation on an image captured by each camera.

The millimeter-wave radar device 252 detects, for example, a relative position or a relative speed of an obstacle with respect to one's vehicle by using, for example, radio waves having a frequency of 30 to 300 GHz, the obstacle existing, for example, on the front side with respect to one's vehicle.

The laser scanner device 253 is a 3D LIDAR that detects the shape and the position of an obstacle around one's vehicle by applying a pulsed laser light and measuring light scattered from the obstacle.

The communication device 254 acquires, by utilizing inter-vehicle communication or road-to-vehicle communication, information regarding an obstacle that is difficult to detect by each sensor above (for example, another vehicle appearing from a location that has been hidden by a building).

The environment recognition unit 250 has the function of detecting a state in which a collision is very likely to occur (detecting a warning of a collision) prior to an actual collision of the vehicle.

In accordance with the warning of a collision, the seat belt control unit 210 causes the shoulder pretensioner 121 and the lap pretensioner 130 to be operated.

Figure 5:
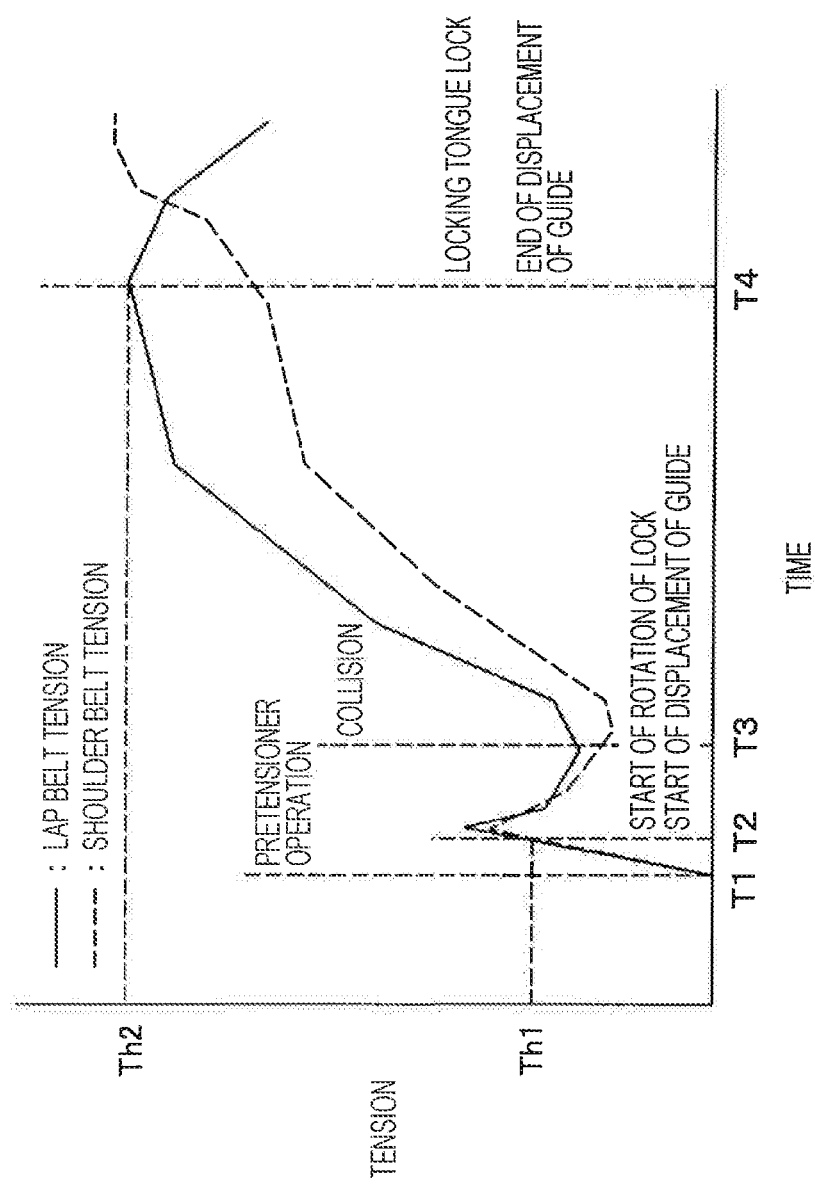
FIG. 5 is a graph illustrating an example of changes in a webbing tension in a collision in the seat belt device of the first embodiment.

FIG. 5 is a graph illustrating an example of changes in webbing tension in a collision in the seat belt device of the first embodiment.

In FIG. 5, the horizontal axis indicates time and the vertical axis indicates tension. In FIG. 5, the tension of the lap belt is indicated by a solid line and the tension of the shoulder belt is indicated by a broken line.

First, at time T1, when the environment recognition unit 250 determines a state in which a frontal collision with, for example, another vehicle is unlikely to be avoided (a pre-crash state), the shoulder pretensioner 121 and the lap pretensioner 130 operate for reducing slack of the webbing 110, and thus the tension of the lap belt 111 and the tension of the shoulder belt 112 are temporarily increased and are subsequently reduced slightly.

At time T2 at which the tension of the webbing 110 (for example, the tension of the lap belt 111 or the tension of the shoulder belt 112, whichever is larger) is increased and becomes greater than or equal to a threshold value Th1 due to the operation of the shoulder pretensioner 121 and the lap pretensioner 130, the lock member 155 of the locking tongue 150 starts to rotate.

A lock mechanism that is described below is capable of restricting the rotation of such a lock member 155 and terminating the restriction on the rotation in accordance with the tension of the webbing 110.

The lock mechanism can include, for example, a resin protrusion that, at the time of ordinary use, protrudes from the lock member 155 and is inserted into a recess formed in the main body 151.

The lock mechanism can be configured to restrict the rotation of the lock member 155 by using the resin protrusion at the time of ordinary use, and to terminate the restriction on the rotation as a result of the resin protrusion breaking or snapping when the tension of the webbing 110 has become the threshold value Th1.

Note that the structure of such a lock mechanism is not limited to the above-described structure, and can be modified as appropriate from, for example, various well-known arts.

Here, the threshold value Th1 is set so that the guide 170 starts to rotate before the upper part of the body of the occupant P starts to move forward due to a completion of a change to the lock state of the locking tongue 150 and a compressive force that is applied to the chest of the occupant P by the shoulder belt 112 becomes exceptionally large.

In response to the start of the rotation of the lock member 155, the guide 170 starts to rotate (swing) in a direction in which the belt holder 171 moves away from the occupant P in the vehicle-width direction.

At time T3, the vehicle actually collides with an obstacle, the vehicle body is accelerated in the front-back direction, and a relative forward movement of the occupant P with respect to the seat 10 is started.

Therefore, both the tension of the lap belt 111 and the tension of the shoulder belt 112 start to increase. At this time, the tension of the lap belt 111 is larger than the tension of the shoulder belt 112.

Thereafter, at time T4, when the tension of the webbing 110 (for example, the tension of the lap belt 111 or the tension of the shoulder belt 112, whichever is larger) is further increased, and becomes greater than or equal to a threshold value Th2, the locking tongue 150 is brought into the lock state.

As a result, the rotation of the guide 170 ends.

Thereafter, the forward movement of the upper part of the body of the occupant P is increased and the tension of the shoulder belt 112 is further increased.

FIG. 6 is a perspective view schematically illustrating a state after the guide in the seat belt device of the first embodiment has rotated.

As illustrated in FIG. 6, as a result of the belt holder 171 of the guide 170 rotating in a direction away from the occupant P in the vehicle-width direction, a location on the shoulder belt 112 that is brought into contact with the chest of the occupant P is displaced upward.

The first embodiment described above makes it possible to provide the following effects.

(1) In a collision of a vehicle, before the upper part of the body of the occupant P starts to move forward due to a change to the lock state of the locking tongue 150 and a compressive force that is applied to the chest of the occupant P by the shoulder belt 112 becomes exceptionally large, the guide 170 moves a lower end of the shoulder belt 112 away and outward in the vehicle-width direction with respect to the occupant P and displaces upward a location on the chest of the occupant P that is brought into contact with the shoulder belt 112. Therefore, it is possible to reduce the possibility of the shoulder belt 112 lifting the ribs of the occupant upward and to reduce injuries to the chest.

(2) When the tension that acts upon the webbing 110 becomes greater than or equal to the threshold value Th1, the guide 170 is operated, and when the tension becomes greater than or equal to the threshold value Th2 that is greater than the threshold value Th1, the locking tongue 150 is brought into the lock state. Therefore, it is possible to properly provide the aforementioned effects by using a simple structure in which the guide 170 and the locking tongue 150 operate in accordance with the tension of the webbing 110. In one embodiment, the threshold value Th1 may serve as a "first threshold value", and the threshold value Th2 may serve as a "second threshold value".

(3) When the threshold value Th1 is smaller than the tension of the webbing 110 when the shoulder pretensioner 121 and the lap pretensioner 130 have operated, the tension of the webbing 110 that is generated by the shoulder pretensioner 121 and the lap pretensioner 130 makes it possible to operate the guide 170 in an improved manner before the tension of the webbing 110 increases due to a collision.

(4) When the guide 170 is configured to be coupled to and to move in response to the lock member 155 of the locking tongue 150, it is possible to form a passive and simple structure that does not use, for example, a dedicated actuator or electronic control for operating the guide 170, and that operates by depending upon the tension of the webbing 110.

Second Embodiment

Next, a second embodiment of the disclosure is described below.

In each embodiment described below, corresponding portions to those of the previous embodiment are given the same reference signs and are not described below. The differences are primarily described.

Figure 7:
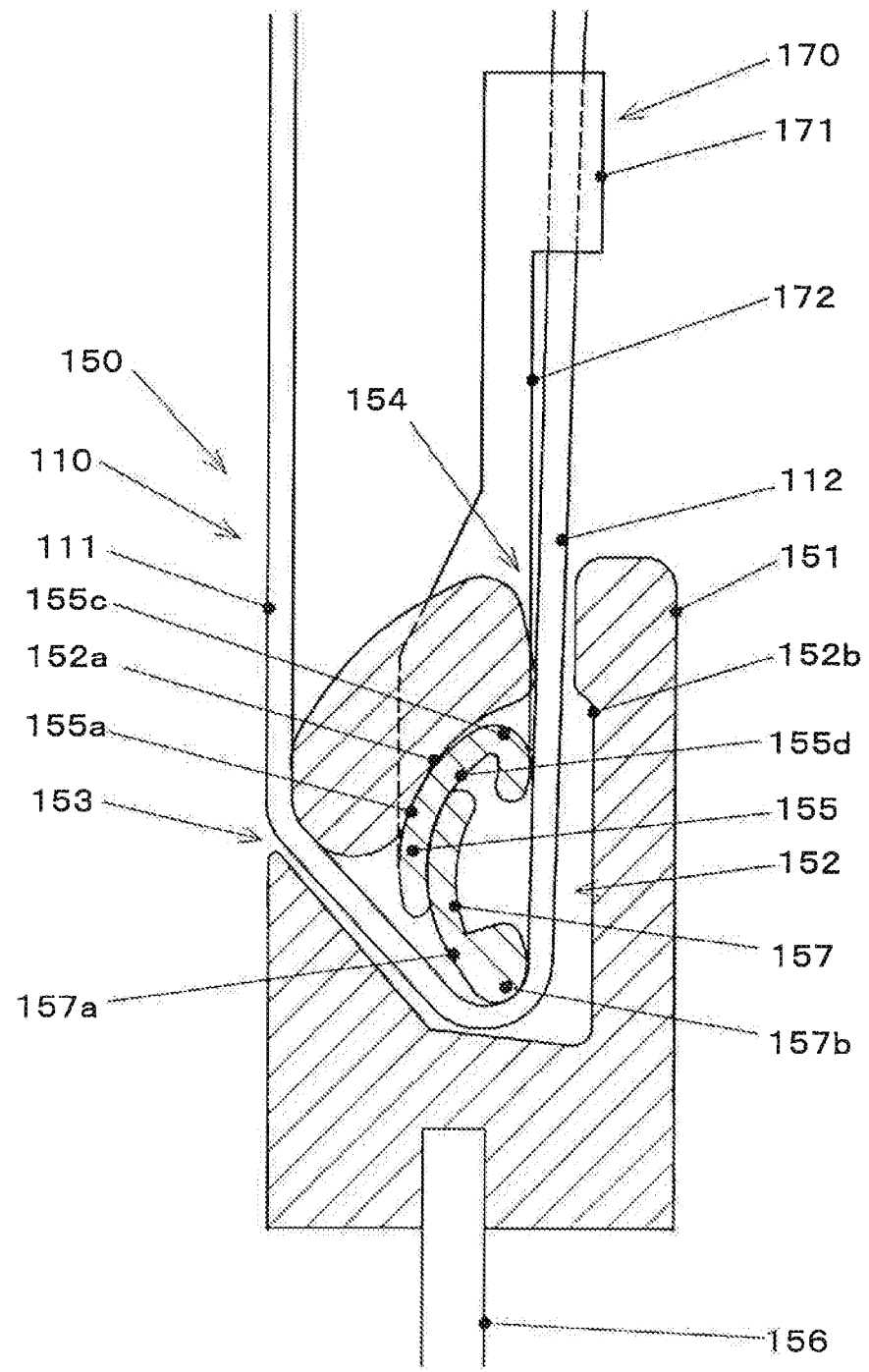
FIG. 7 is a schematic sectional view of a locking tongue in a second embodiment of a seat belt device to which an embodiment of the present disclosure is applied, and illustrates a free state.
Figure 8:
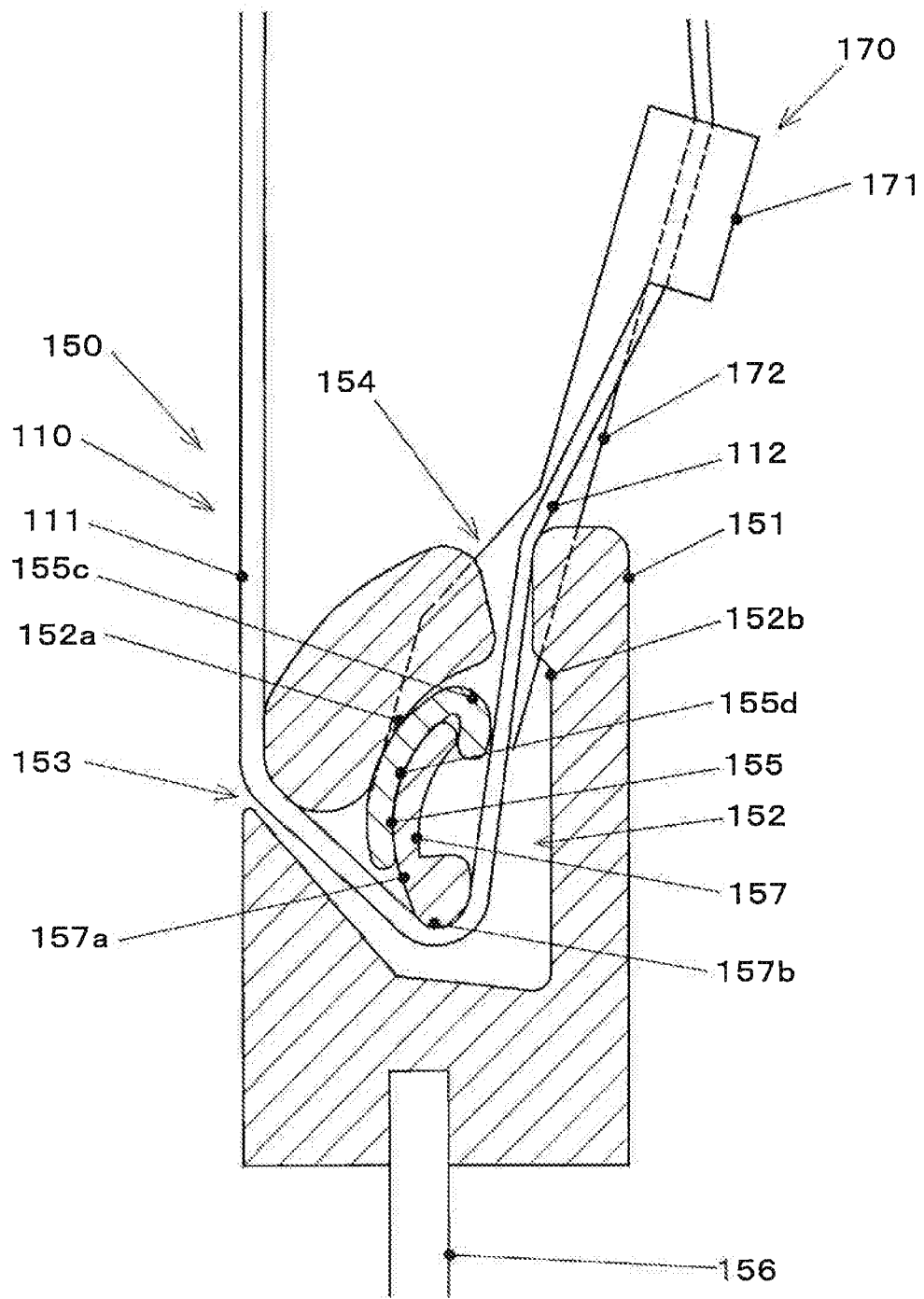
FIG. 8 is a schematic sectional view of the locking tongue in the seat belt device of the second embodiment, and illustrates an intermediate state.
Figure 9:
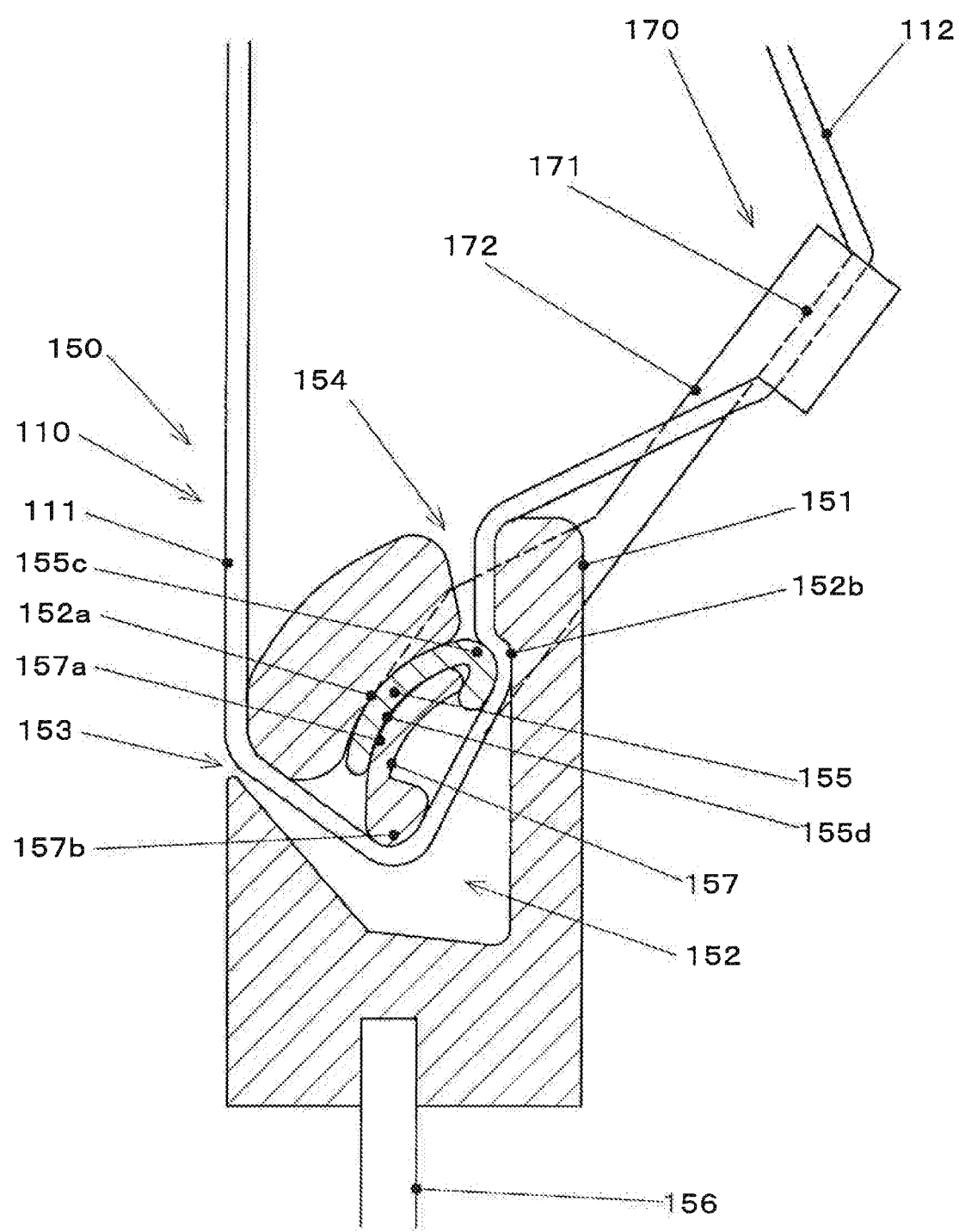
FIG. 9 is a schematic sectional view of the locking tongue in the seat belt device of the second embodiment, and illustrates a lock state.

FIGS. 7, 8, and 9 are each a schematic sectional view of a locking tongue in the seat belt device of the second embodiment, FIG. 7 illustrating a free state, FIG. 8 illustrating an intermediate state, and FIG. 9 illustrating a lock state.

A locking tongue 150 of the second embodiment includes a guide interlocking member 157 described below.

The guide interlocking member 157 is held to be displaceable relative to a guide 170 substantially in a direction in which a lock member 155 is displaced relative to the main body 151 (direction along a curve of a sliding surface). In one embodiment, the guide interlocking member 157 may serve as a "movable member".

A base (a locking-tongue-150-side end) of a stay 172 of the guide 170 is coupled and fixed to the guide interlocking member 157.

In the second embodiment, a sliding surface 155d that slides relative to the guide interlocking member 157 is formed at a surface of the lock member 155 on a side opposite to a sliding surface 155a.

The sliding surface 155d is a concave-shaped surface having a shape that is similar to the shape of a sliding surface 152a of the main body 151.

The webbing contact member 157b is not provided at the lock member 155 of the second embodiment.

The guide interlocking member 157 includes, for example, a sliding surface 157a and a webbing contact member 157b.

The sliding surface 157a is a convex-shaped portion that in a slidable state comes into contact with the sliding surface 155d of the lock member 155.

The webbing contact member 157b is a convex-shaped portion that is provided at one end side (lower end in FIGS. 7 to 9) of the sliding surface 157a and comes into contact with a fold portion of a webbing 110.

When the tension that acts on the webbing 110 is increased in a vehicle collision, first, the locking tongue 150 is brought from the free state illustrated in FIG. 7 to the intermediate state illustrated in FIG. 8.

At this time, the sliding surfaces 155d and 157a slide to cause the guide interlocking member 157 to move upward with respect to the lock member 155 and to cause an upper end of the guide interlocking member 157 to rotate in a direction away from an occupant P in the vehicle-width direction.

Therefore, the guide 170 also rotates together with the guide interlocking member 157 in a direction in which a belt holder 171 moves away from the occupant P.

Note that at this time the lock member 155 is not displaced relative to the main body 151.

Thereafter, when the upper end of the guide interlocking member 157 collides with a webbing restrainer 155c of the lock member 155, the lock member 155 together with the guide interlocking member 157 moves upward and rotates along the sliding surface 152a, and is finally brought into the lock state illustrated in FIG. 9 and restrains the webbing 110.

Even the second embodiment described above makes it possible to provide the effects that are the same as the effects provided by the first embodiment above.

Further, since the lock member 155 and the guide interlocking member 157 are separate members, it is possible to move the guide interlocking member 157 by a large amount without being restricted by the range of movement of the lock member 155. Therefore, it is possible to increase the range of operation of the guide 170.

Third Embodiment

A third embodiment of the disclosure will be described below.

Figure 10:
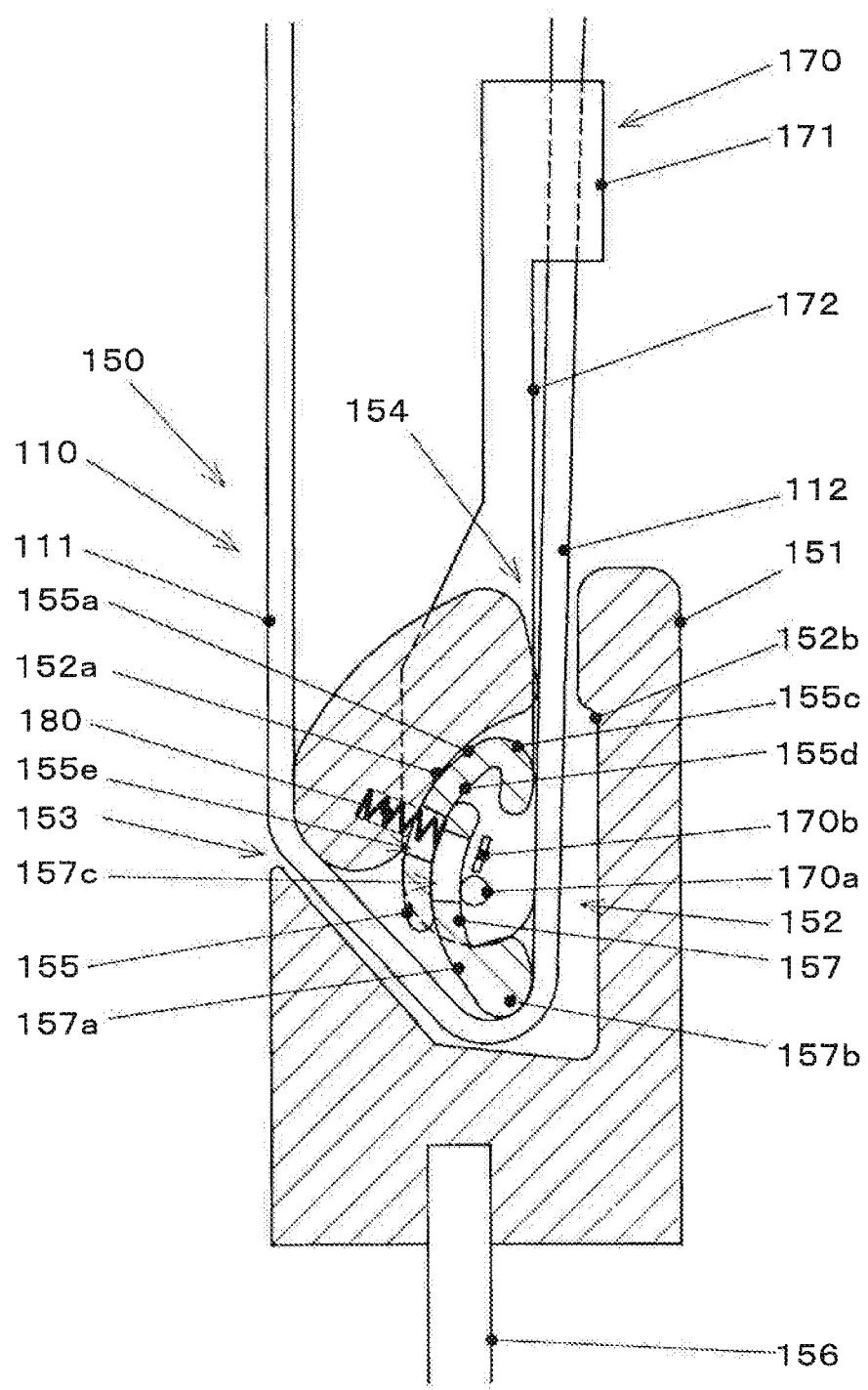
FIG. 10 is a schematic sectional view of a locking tongue in a seat belt device of a third embodiment, and illustrates a free state.
Figure 11:
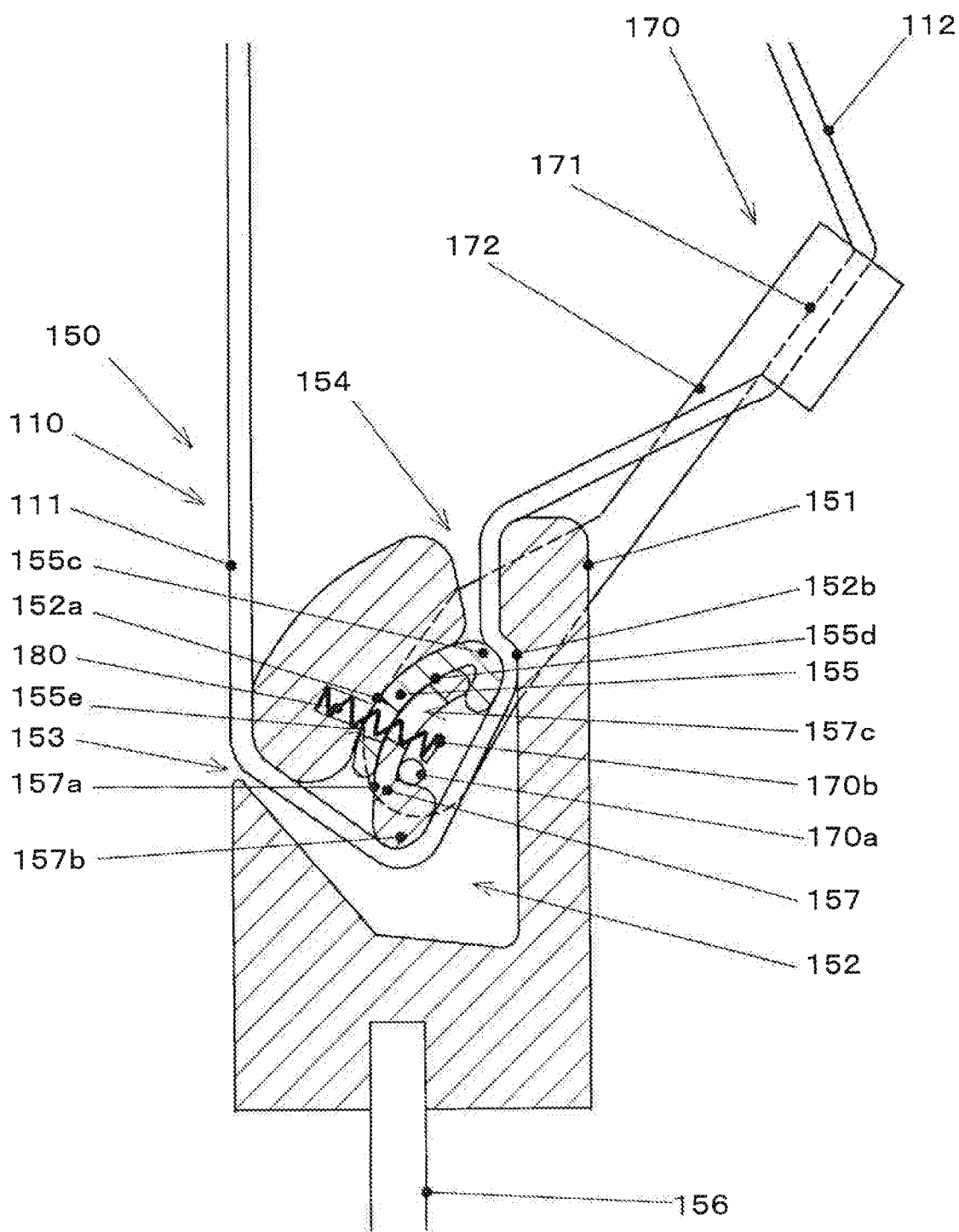
FIG. 11 is a schematic sectional view of the locking tongue in the seat belt device of the third embodiment, and illustrates a lock state.

FIGS. 10 and 11 are each a schematic sectional view of a locking tongue in the seat belt device of the third embodiment, FIG. 10 illustrating a free state and FIG. 11 illustrating a lock state.

In the seat belt device of the third embodiment, instead of using the structure in which the lock member 155 of the locking tongue 150 or the like and the guide move in response to each other as in the first and second embodiments, the guide 170 is displaced in accordance with a collision or a warning of a collision by, for example, a coil spring 180. In one embodiment, the coil spring 180 may serve as an "urging member".

In the third embodiment, the guide 170 is formed separately from the lock member 155 and a guide interlocking member 157.

The guide 170 includes a support shaft 170a and a spring receiver 170b.

The support shaft 170a is a portion that is provided at a main-body-151-side end of the guide 170 and that swingably supports the guide. The guide 170 is capable of swinging around the support shaft 170a independently of the lock member 155 and the guide interlocking member 157.

The support shaft 170a has, for example, an axial direction in a width direction of a webbing 110.

The coil spring 180 is inserted into a recess of a sliding surface of the main body 151 of the locking tongue 150. The recess is formed by causing a sliding surface 152a of the main body 151 of the locking tongue 150 to be recessed.

The lock member 155 has an opening 155e that extends therethrough from a sliding-surface-155a side to a guide-interlocking-member-157 side.

The guide interlocking member 157 has an opening 157c that extends therethrough from a lock-member-155 side to a spring-receiver-170b side.

In the free state illustrated in FIG. 10, a protruding end of the coil spring 180, though inserted into the opening 155e, is not insertable into the opening 157c, and the coil spring 180 does not press the spring receiver 170b of the guide 170.

At this time, when the tension that acts upon the webbing 110 is less than the threshold value Th1, the guide interlocking member 157 functions as a lock that restricts the operation of the guide 170.

When the tension that acts upon the webbing 110 becomes greater than or equal to the threshold value Th1 and the lock member 155 and the guide interlocking member 157 start to be displaced, as illustrated in FIG. 11, the protruding end of the coil spring 180 is inserted into the opening 157c and presses the spring receiver 170b of the guide 170.

Therefore, the guide 170 rotates around the support shaft 170a and is displaced in a direction in which a belt holder 171 moves away from an occupant P in the vehicle-width direction.

The opening 155e and the opening 157c are formed as, in order to realize the function above, long holes having a longitudinal direction in a direction of movement of the lock member 155 and the guide interlocking member 157.

The third embodiment described above, in addition to providing the effects that are the same as the effects provided by the first embodiment described above, makes it possible to increase designing freedom, such as an operational force and a displacement range of the guide 170 by, for example, setting a spring rate of the coil spring 180 while using a passive and simple structure that does not use, for example, a dedicated actuator or electronic control for operating the guide 170 and that operates by depending upon the tension of the webbing.

Fourth Embodiment

Next, a fourth embodiment of the disclosure is described below.

Figure 12:
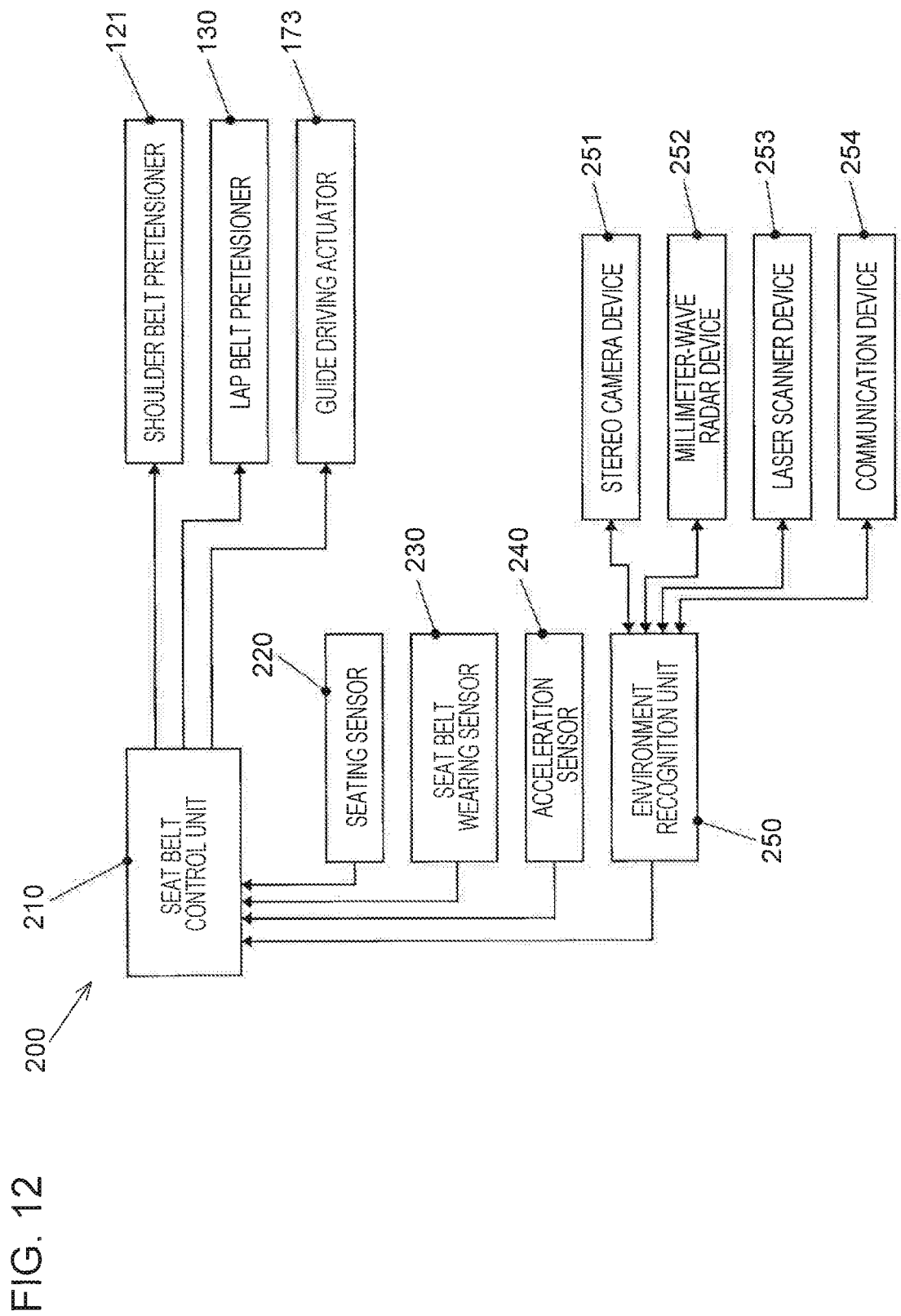
FIG. 12 is a block diagram schematically illustrating a configuration of a control system in a fourth embodiment of a seat belt device to which an embodiment of the disclosure is applied.

FIG. 12 is a block diagram schematically illustrating a configuration of a control system in the seat belt device of the fourth embodiment.

In the fourth embodiment, instead of using the structure in which the guide 170 moves in response to the locking tongue 150 as in the first and second embodiments or the structure that operates by using a spring element as in the third embodiment, a guide driving actuator 173 is used. The guide driving actuator 173 drives a guide 170 in accordance with a command from a seat belt control unit 210 and in a direction in which a belt holder 171 moves away from an occupant in the vehicle-width direction.

As the guide driving actuator 173, for example, various actuators, such as an actuator using an explosive gas-generating device or an electric actuator, can be used.

The seat belt control unit 210 supplies a command to the guide driving actuator 173 so that the operation of the guide 170 is completed earlier than when the tension of a webbing 110 is increased and the locking tongue 150 is brought into a lock state in accordance with a detection of a collision or a warning of a collision.

The fourth embodiment described above, in addition to providing the effects that are the same as the effects provided by the first embodiment described above (excluding the effect described in item (4)), makes it possible to increase the freedom with which the timing of the operation of the guide 170 is set and to increase the effects described above.

Modifications

The disclosure is not limited to the embodiments described above and can be variously modified and changed. Such modifications and changes are within the technical scope of the disclosure.

(1) The structure of the vehicle and the structure of the seat belt device are not limited to those of the embodiments described above and can be changed as appropriate.

For example, the shapes, the structures, the functions, the dispositions, and the number of the components constituting the seat belt can be changed as appropriate.

(2) The structure of the mechanism that drives the guide in each embodiment is one example and can be changed as appropriate.

For example, the internal structure of the locking tongue is one example and can be changed as appropriate and thus the structure that causes a structural member of the locking tongue and the guide to move in response to each other is also not particularly limited.

For example, it is possible to provide a power transmission mechanism including, for example, a gear train between the movable member among the members of the locking tongue and the guide and thus to increase or decrease the speed of movement of the movable member and to transfer the speed of movement of the movable member to the guide.

Although, in each embodiment, the locking tongue is a passive locking tongue that is brought into the lock state in accordance with an increase in the tension of the webbing, an active locking tongue that brings the locking tongue into the lock state by an actuator in accordance with a command from a control device may be used.

(3) Although, in each embodiment described above, the guide protrudes upward from the locking tongue at the time of ordinary use (in a non-collision state), the guide may be contracted or accommodated at the time of ordinary use and may be extended (drawn out) in a collision.

As described above, according to the disclosure, it is possible to provide a seat belt device that reduces injury to the chest caused by a shoulder belt.

The invention claimed is:

1. A seat belt device comprising:
a webbing comprising a lap belt and a shoulder belt, at least a portion of the lap belt being configured to be disposed to extend in a vehicle-width direction along a front of an abdomen of an occupant, at least a portion of the shoulder belt being configured to be disposed obliquely along a front of a chest of the occupant;
a locking tongue comprising a slit that is provided to insert an intermediate portion of the webbing therein, the locking tongue being provided between the lap belt and the shoulder belt, the locking tongue being configured to be coupled to a vehicle body when the occupant fastens the seat belt device, the locking tongue being configured to undergo a change from a free state to a lock state in accordance with a collision or a warning of the collision of a vehicle, the free state being a state in which the webbing is capable of passing between a side of the lap belt and a side of the shoulder belt, the lock state being a state in which the webbing is not capable of passing between the side of the lap belt and the side of the shoulder belt; and a guide configured to, in accordance with the collision or the warning of the collision of the vehicle, displace in a direction away from the occupant in the vehicle-width direction such that a location on the shoulder belt that is adjacent to the locking tongue is also displaced in a direction away from the occupant in the vehicle-width direction before the change to the lock state of the locking tongue is completed.

2. The seat belt device according to claim 1, further comprising:

an actuator configured to drive a location on the guide that is brought into contact with the shoulder belt in the direction away from the occupant, a collision detector configured to detect the collision or the warning of the collision of the vehicle, and a controller configured to operate the actuator in accordance with a detection result provided by the collision detector.

3. The seat belt device according to claim 1, wherein, when a tension that acts upon the webbing becomes greater than or equal to a first threshold value, the guide displaces the location on the shoulder belt that is adjacent to the locking tongue, and when the tension that acts upon the webbing becomes greater than or equal to a second threshold value that is greater than the first threshold value, the change to the lock state of the locking tongue is completed.

4. The seat belt device according to claim 3, further comprising:

an urging member configured to urge the guide in a direction in which the location on the shoulder belt that is adjacent to the locking tongue is moved or urged in the direction away from the occupant, and a lock configured to restrict an operation of the guide when the tension that acts upon the webbing is less than the first threshold value.

5. The seat belt device according to claim 3, further comprising:

a pretensioner configured to apply a tension to the webbing in accordance with the collision or the warning of the collision of the vehicle, wherein the first threshold value is smaller than the tension of the webbing when the pretensioner has operated.

6. The seat belt device according to claim 5, wherein the locking tongue further comprises a movable member configured to be displaced relative to a main body by the tension of the webbing, and the guide is configured to move in response to the movable member.

7. The seat belt device according to claim 5, further comprising:

an urging member configured to urge the guide in a direction in which the location on the shoulder belt that is adjacent to the locking tongue is moved or urged in the direction away from the occupant, and a lock configured to restrict an operation of the guide when the tension that acts upon the webbing is less than the first threshold value.

8. A seat belt device comprising:

a webbing comprising a lap belt and a shoulder belt, at least a portion of the lap belt being configured to be disposed to extend in a vehicle-width direction along a front of an abdomen of an occupant, at least a portion of the shoulder belt being configured to be disposed obliquely along a front of a chest of the occupant;

a locking tongue comprising a slit that is provided to insert an intermediate portion of the webbing therein, the locking tongue being provided between the lap belt and the shoulder belt, the locking tongue being configured to be coupled to a vehicle body when the occupant fastens the seat belt device, the locking tongue being configured to undergo a change from a free state to a lock state in accordance with a collision or a warning of the collision of a vehicle, the free state being a state in which the webbing is capable of passing between a side of the lap belt and a side of the shoulder belt, the lock state being a state in which the webbing is not capable of passing between the side of the lap belt and the side of the shoulder belt; and a guide configured to, in accordance with the collision or the warning of the collision of the vehicle, displace a location on the shoulder belt that is adjacent to the locking tongue in a direction away from the occupant in the vehicle-width direction before the change to the lock state of the locking tongue is completed wherein, when a tension that acts upon the webbing becomes greater than or equal to a first threshold value, the guide displaces the location on the shoulder belt that is adjacent to the locking tongue, and when the tension that acts upon the webbing becomes greater than or equal to a second threshold value that is greater than the first threshold value, the change to the lock state of the locking tongue is completed, wherein the locking tongue further comprises a movable member configured to be displaced relative to a main body by the tension of the webbing, and the guide is configured to move in response to the movable member.

9. The seat belt device according to claim 8, further comprising:

an actuator configured to drive a location on the guide that is brought into contact with the shoulder belt in the direction away from the occupant, a collision detector configured to detect the collision or the warning of the collision of the vehicle, and a controller configured to operate the actuator in accordance with a detection result provided by the collision detector.

10. The seat belt device according to claim 8, wherein, when a tension that acts upon the webbing becomes greater than or equal to a first threshold value, the guide displaces the location on the shoulder belt that is adjacent to the locking tongue, and when the tension that acts upon the webbing becomes greater than or equal to a second threshold value that is greater than the first threshold value, the change to the lock state of the locking tongue is completed.

11. The seat belt device according to claim 10, further comprising:

a pretensioner configured to apply a tension to the webbing in accordance with the collision or the warning of the collision of the vehicle, wherein the first threshold value is smaller than the tension of the webbing when the pretensioner has operated.

12. The seat belt device according to claim 10, further comprising:
- an urging member configured to urge the guide in a direction in which the location on the shoulder belt that is adjacent to the locking tongue is moved or urged in the direction away from the occupant, and
- a lock configured to restrict an operation of the guide when the tension that acts upon the webbing is less than the first threshold value.

13. A seat belt device comprising:
- a webbing comprising a lap belt and a shoulder belt, at least a portion of the lap belt being configured to be disposed to extend in a vehicle-width direction along a front of an abdomen of an occupant, at least a portion of the shoulder belt being configured to be disposed obliquely along a front of a chest of the occupant;
- a locking tongue comprising a slit that is provided to insert an intermediate portion of the webbing therein, the locking tongue being provided between the lap belt and the shoulder belt, the locking tongue being configured to be coupled to a vehicle body when the occupant fastens the seat belt device, the locking tongue being configured to undergo a change from a free state to a lock state in accordance with a collision or a warning of the collision of a vehicle, the free state being a state in which the webbing is capable of passing between a side of the lap belt and a side of the shoulder belt, the lock state being a state in which the webbing is not capable of passing between the side of the lap belt and the side of the shoulder belt; and
- a guide that extends within the locking tongue and externally away from the locking tongue into contact with the shoulder belt prior to a collision or a warning of the collision of the vehicle, with the guide being configured to shift in position, relative to the locking tongue, as to, in accordance with the collision or the warning of the collision of the vehicle, displace a location on the shoulder belt that is adjacent to the locking tongue in a direction away from the occupant in the vehicle-width direction before the change to the lock state of the locking tongue is completed.

14. The seat belt device according to claim 13, further comprising:
- an actuator configured to drive a location on the guide that is brought into contact with the shoulder belt in the direction away from the occupant,
- a collision detector configured to detect the collision or the warning of the collision of the vehicle, and
- a controller configured to operate the actuator in accordance with a detection result provided by the collision detector.

15. The seat belt device according to claim 13, wherein,
- when a tension that acts upon the webbing becomes greater than or equal to a first threshold value, the guide displaces the location on the shoulder belt that is adjacent to the locking tongue, and
- when the tension that acts upon the webbing becomes greater than or equal to a second threshold value that is greater than the first threshold value, the change to the lock state of the locking tongue is completed.

16. The seat belt device according to claim 15, further comprising:
- a pretensioner configured to apply a tension to the webbing in accordance with the collision or the warning of the collision of the vehicle,
- wherein the first threshold value is smaller than the tension of the webbing when the pretensioner has operated.

17. The seat belt device according to claim 15, further comprising:
- an urging member configured to urge the guide in a direction in which the location on the shoulder belt that is adjacent to the locking tongue is moved or urged in the direction away from the occupant, and
- a lock configured to restrict an operation of the guide when the tension that acts upon the webbing is less than the first threshold value.

* * * * *